S. A. DARRACH.
APPARATUS FOR CONTRACTED JOINTS.

No. 183,376.  Patented Oct. 17, 1876.

Witnesses.
Chaz. Wahlers.
Otto Hufeland.

Inventor.
Samuel A. Darrach
by VanSantvoord & Hauff
his attys

UNITED STATES PATENT OFFICE.

SAMUEL A. DARRACH, OF ORANGE, NEW JERSEY.

IMPROVEMENT IN APPARATUS FOR CONTRACTED JOINTS.

Specification forming part of Letters Patent No. 183,376, dated October 17, 1876; application filed April 12, 1876.

*To all whom it may concern:*

Be it known that I, SAMUEL A. DARRACH, of Orange, in the county of Essex and State of New Jersey, have invented a new and useful Improvement in Apparatus for Support and Extension of Weak or Contracted Joints, which improvement is fully set forth in the following specification, reference being had to the accompanying drawing, in which—

Figure 1:
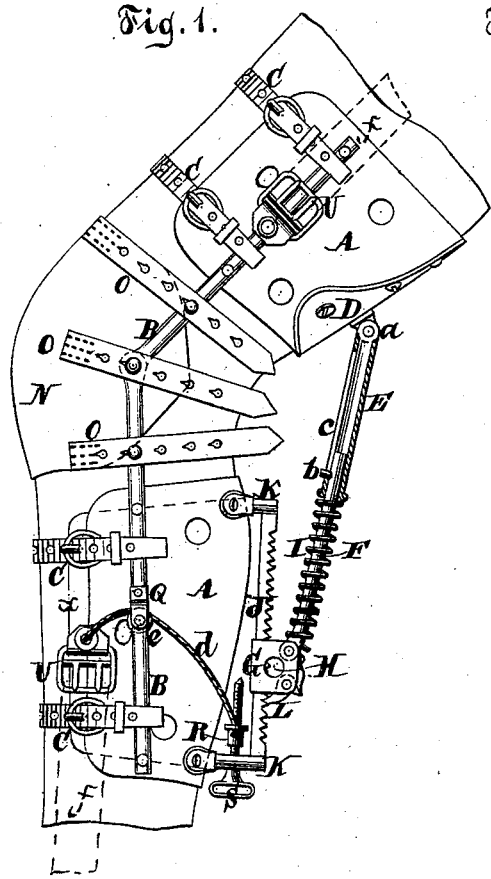
Figure 2:
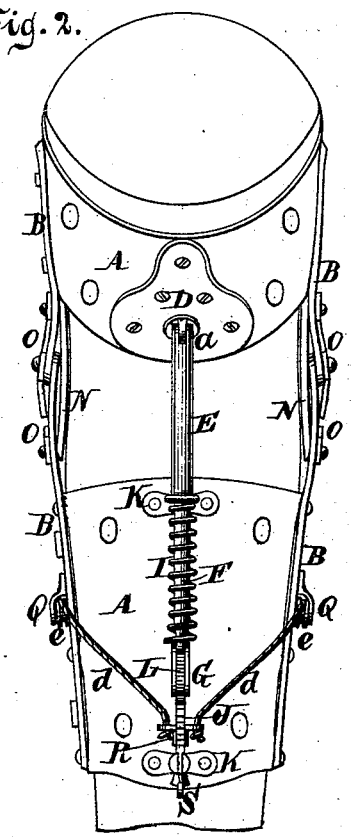
Figure 3:
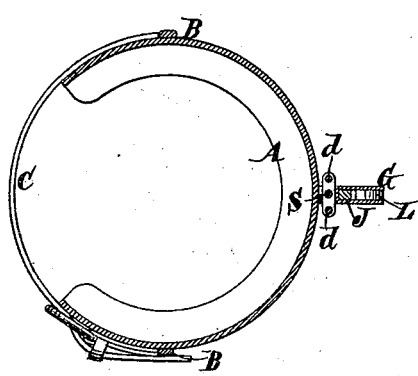

Figure 1 represents a side view of my improvement, showing the mode of applying it to a knee-joint. Fig. 2 is a rear view of the same. Fig. 3 is a cross-section of one of the clasps.

Similar letters indicate corresponding parts.

In apparatus hitherto commonly used for extending contracted joints, the means relied upon for extending the joint consists of a screw operating upon the limb above and below the joint. Such devices are objectionable in most cases, for the reason that the joint, after the application of force to extend it by the extension of the screw, is held by the screw stationary in its new position, and is compelled or allowed to stiffen again, so that after every extension of the joint the joint is rigidly held, so that it becomes stiff, and, consequently, the patient is repeatedly compelled to undergo the pain of destroying the renewed stiffness of the joint, and the important aid which would be afforded by a slight degree of motion through the voluntary efforts of the patient is prevented. Another objection arises from the necessity in many cases of securing the bearing ends of the male and female parts of the screw at the farthest possible distance apart, whereby the screw is of necessity placed outside of the pantaloons of the patient, so as to expose it to view. My invention obviates these disadvantages.

It consists in the use of a spring in place of a screw, in conjunction with rods telescoping one within the other, and with a rack and pawl, the latter being made to engage the rack, and being affixed to one of the telescoping rods in such a manner that by the spring a continual pressure is brought to bear on either side of the joint, while by the pawl and rack this pressure may be regulated. The telescoping rods and the rack are attached to clasps, which are applied to the proper parts of a limb, and the pawl is affixed to one of the telescoping rods through the medium of a slide, which is arranged upon the rack so as to be movable thereon, and by means of the slide the pawl may be adjusted to any desired position on the rack, and the pressure of the spring regulated. My invention also embraces a device for drawing or straining the joint apart in cases where the joint is compressed or drawn together to an unnatural degree.

In the drawing, the letters A A designate clasps, such as I use for affixing my apparatus to the limb of a patient. The clasps are connected together by means of rigid splints or bars B B, which are jointed to each other and provided with straps C C, by which they are fastened to the limb. These clasps A A I prefer to make of rawhide prepared according to my invention, for which I am about to make application for a patent; but they may be made of any other material suitable for the purpose. The uppermost clasp A has a bearing-plate, D, fastened to it, and to a lug, a, projecting from this plate is pivoted the upper end of a tubular rod, E, within which telescopes a rod, F, the latter being provided with a guide-pin, b, which works in a slot, c, formed in the rod in the direction of its length. The lower end of the rod F is pivoted to a slide, G, and upon the rod is placed a spiral spring, I, one end of which bears against the end of the rod E and the other against the slide G. The slide G moves up and down on a rack, J, which is secured to the lowermost clasp A by means of brackets K, and which contains a spring-pawl, L, which engages the teeth of the rack J.

The letter N designates a pad, which is intended to go over the contracted joint of a limb, in the manner shown in Fig. 1, the pad being provided with straps O, by which it is fastened to the splints or bars B B.

Figure 4:
Figure 5:
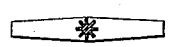

In applying my apparatus to a limb having a contracted joint, I fasten the clasps A A to the limb above and below the joint, as shown in the drawing, where I have represented my invention applied to a contracted knee-joint. By thus fastening the clasp, the spring-rods E F are brought behind the joint, and by sliding the pawl L upward on the rack J, pressure is brought to bear by the action of the spring and rods on the upper and lower clasps A A, above and below the joint, tending to straighten the limb and extend the contracted joint. The tension of the spring I is regulated by adjusting the pawl L in the toothed rack J; and to facilitate this adjustment I form in the slide G a hole, H, for the reception of a key (shown in Fig. 4 in side view, and in Fig. 5 in cross-section) provided with teeth, that fit those of the rack, and by turning which the slide G and the pawl may be moved either up or down on the rack. The pad N is intended to form a support for the contracted joint, and it is adjusted by means of the straps O to the desired tightness.

I will next describe that part of my invention which relates to relieving undue compression of the parts of the joint against each other.

To the lower clasp A are connected cords $d$, passing on each side of the clasp over pulleys $e$, which are mounted in brackets Q, attached to the splints or bars B B. The cords $d$ are fastened to one end to ears projecting from a collar, R, which is fitted on an adjusting-screw, S, working in one of the brackets K, by which the rack J is fastened to the clasp. The other ends of the cords are provided with buckles U, to receive bands $f$, which are thus secured at one end to the cords, while the other ends are attached to the sides of the limb below the knee by means of adhesive plaster $x$, applied to the limb under the clasp. The part of the leg below the knee is pulled downward from the joint by turning the screw S, which action strains the lower bands $f$ over the lower edges of the lower clasps against the resistance of the clasps and their frame, the adhesive plaster beneath the upper clasp aiding to keep the clasps stationary, so as to insure the full effect of the pull of the screw on the lower bands $f$. By this means the compression by which the parts of the joint are held against each other is more or less counteracted, and the pain consequent thereon very much relieved; and, furthermore, the operation of straightening the joint is materially facilitated.

I also attach buckles U and bands $f$ to the upper clasp, or to its frame, on both sides, and attach such bands $f$ to adhesive plaster fastened to the limb above the knee, beneath the upper clasp, so as to aid in holding the upper clasp stationary and prevent it from being pulled upward. Any equivalent fastening devices may be used instead of the buckles U, and bands $f\,f$, and adhesive plaster. When it is desired to relieve the joint from the pressure of the spring I, the pawl L is thrown out from the rack and the slide left free.

It will be readily understood that by my invention a continuous, and at the same time a yielding, pressure is brought to bear on the contracted joint, whereby not only an expeditious cure is effected, but the pain is greatly lessened, if not prevented. Also, by means of this yielding support, a proper degree of motion is permitted, tending to a more perfect development of the functions of the joint. When a rigid extension or support is desired, the spring may be removed and a tube supplied in its place, thus preventing the telescoping of the rods.

What I claim as new, and desire to secure by Letters Patent, is—

1. The combination of the clasps A A with the spring I and rods E F, and the rack and pawl J L, substantially as described.

2. The cords $d$ and bands $f$, arranged upon the clasps A, and operated by means of an adjusting-screw, S, substantially as described.

In testimony that I claim the foregoing I have hereunto set my hand and seal this 9th day of October, 1875.

S. A. DARRACH. [L. S.]

Witnesses:
ROBT. E. MILLER,
J. VAN SANTVOORD.